United States Patent
Tsirkin et al.

(10) Patent No.: US 11,113,089 B2
(45) Date of Patent: Sep. 7, 2021

(54) SHARING DATA VIA VIRTUAL MACHINE TO HOST DEVICE BRIDGING

(71) Applicant: Red Hat Israel, Ltd., Ra'anana (IL)

(72) Inventors: Michael Tsirkin, Lexington, MA (US); Stefan Hajnoczi, St. Neots (GB)

(73) Assignee: Red Hat Israel, Ltd., Ra'anana (IL)

(*) Notice: Subject to any disclaimer, the term of this patent is extended or adjusted under 35 U.S.C. 154(b) by 508 days.

(21) Appl. No.: 15/905,101

(22) Filed: Feb. 26, 2018

(65) Prior Publication Data

US 2018/0189094 A1 Jul. 5, 2018

Related U.S. Application Data

(60) Division of application No. 15/054,489, filed on Feb. 26, 2016, now Pat. No. 9,910,693, which is a continuation-in-part of application No. 14/951,686, filed on Nov. 25, 2015, now Pat. No. 9,875,131.

(51) Int. Cl.
*G06F 9/455* (2018.01)

(52) U.S. Cl.
CPC .............. *G06F 9/45558* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 8,086,765 | B2 | 12/2011 | Turner et al. |
| 8,265,075 | B2 | 9/2012 | Pandey |
| 8,537,860 | B2 | 9/2013 | Kidambi et al. |
| 8,615,757 | B2* | 12/2013 | Klotz, Jr. .............. G06F 9/5077 718/1 |
| 8,761,187 | B2 | 6/2014 | Barde |
| 8,850,146 | B1 | 9/2014 | Majumdar |
| 8,953,439 | B1 | 2/2015 | Lin et al. |
| 9,021,475 | B2 | 4/2015 | Nimmagadda et al. |
| 9,122,594 | B2* | 9/2015 | Mahalingam ........... G06F 13/24 |
| 9,720,712 | B2* | 8/2017 | Tsirkin .................. G06F 9/4868 |
| 2009/0119087 | A1 | 5/2009 | Ang et al. |

(Continued)

OTHER PUBLICATIONS

Recio et al., "Automated Ethernet Virtual Bridging", 2009, IBM Data Center Networking CTO; AIX Ethernet Virtual Switching Development, excerpt from http://www.itc21.net/fileadmin/ITC21_files/DC-CAVES/DC-CAVES_-_AutomatedEthernetVirtualBridging_presentation.pdf (19 pages).

(Continued)

*Primary Examiner* — Bing Zhao
(74) *Attorney, Agent, or Firm* — K&L Gates LLP

(57) ABSTRACT

In an example embodiment, a hypervisor exposes a first guest device to a first virtual machine. The hypervisor exposes a virtual host device and a pass-through device to a second virtual machine. The hypervisor maps a first memory and a second memory into the second virtual machine at a first base address register and a second base address register associated with the virtual host device and pass-through device. The hypervisor sends a mapping from the first virtual machine to the second virtual machine. The hypervisor sends a first address of a first ring of the first guest device and a second address of a second ring of an assigned device to the second virtual machine.

15 Claims, 10 Drawing Sheets

(56) References Cited

U.S. PATENT DOCUMENTS

2014/0310704 A1   10/2014   Cantu

OTHER PUBLICATIONS

Yechiel, "Red Hat Enterprise Linux OpenStack Platform 6: SR-IOV Networking—Part I: Understanding the Basics", Mar. 5, 2015, excerpt from http://redhatstackblog.redhat.com/2015/03/05/red-hat-enterprise-linux-openstack-platform-6-sr-iov-networking-part-i-understanding-the-basics/ (3 pages).
"Virtual Networking Technologies at the Server-Network Edge", Nov. 2011, excerpt from http://h20565.www2.hp.com/hpsc/doc/public/display?docId=emr_na-c02044591 (12 pages).
Pratt et al; Xen 3.0 and the Art of Virtualization; Proceedings of the Linux Symposium vol. 2; Jul. 2005.
Damouny et al; I/O Virtualization (IOV) & its uses in the network infrastructure Parts 1-3, embedded.com, Jun. 2, 2009.

* cited by examiner

SHARING DATA VIA VIRTUAL MACHINE TO HOST DEVICE BRIDGING

PRIORITY CLAIM AND CROSS-REFERENCE TO RELATED APPLICATION

The present application is a divisional of U.S. application Ser. No. 15/054,489, filed Feb. 26, 2016, which is a continuation-in-part of and claims priority to U.S. application Ser. No. 14/951,686, now U.S. Pat. No. 9,875,131, filed on Nov. 25, 2015, the entire contents of which are incorporated herein.

BACKGROUND

The present disclosure relates generally to memory management of virtual machines and host devices in virtualized systems. Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor. The present disclosure provides improved systems and methods for managing memory in a virtual environment.

SUMMARY

The present disclosure provides new and innovative methods and system for virtual machine memory management. For example, a method includes exposing, by a hypervisor, a first guest device to a first guest operating system (OS) of a first virtual machine. The hypervisor exposes a second guest device to a second guest OS of a second virtual machine. The hypervisor exposes a first virtual host device to a third guest OS of a third virtual machine. The hypervisor exposes a second virtual host device to the third guest OS of the third virtual machine. Then, the hypervisor maps a first memory into the third virtual machine at a first base address register (BAR) of the first virtual host device. The first memory is part of the first guest OS memory of the first virtual machine. The hypervisor maps a second memory into the third virtual machine at a second BAR of the second virtual host device. The second memory is part of the second guest OS memory of the second virtual machine. Then, the hypervisor sends a first mapping from the first virtual machine to the third virtual machine. The first mapping is mapped at a first offset. The hypervisor sends a second mapping from the second virtual machine to the third virtual machine. The second mapping is mapped at a second offset. Then, the hypervisor sends a first address of a first ring of the first guest device to the third virtual machine through the first virtual host device. The first address of the first ring is stored in the first memory. The hypervisor sends a second address of a second ring of the second guest device to the third virtual machine through the second virtual host device. The second address of the second ring is stored in the second memory.

Another example method includes reading, by a first driver of a third virtual machine, a first descriptor available in a first ring supplied by a first guest device. A second driver of the third virtual machine reads a second descriptor available in a second ring supplied by a second guest device. Then, the first driver translates a third address of the first guest device using a first offset within a first BAR of a first virtual host device. The second driver translates a fourth address of the second guest device using a second offset within a second BAR of a second virtual host device. Then, the first driver performs a first operation on at least one first packet within the first ring of the first guest device. The second driver performs a second operation on at least one second packet within the second ring of the second guest device.

An example system includes a first memory, a second memory, one or more physical processors, a host operating system (OS), one or more virtual machines including a guest OS, and a hypervisor. The one or more physical processors is in communication with the first memory and the second memory. The host OS executes on the one or more physical processors. The one or more virtual machines, including a guest operating system (OS), execute on the one or more physical processors. The hypervisor executes on the one or more processors to expose a first guest device to a first guest OS of a first virtual machine, expose a second guest device to a second guest OS of a second virtual machine, expose a first virtual host device to a third guest OS of a third virtual machine, expose a second virtual host device to the third guest OS of the third virtual machine, and map the first memory into the third virtual machine at a first base address register (BAR) of the first virtual host device. The first memory is part of the first guest OS of the first virtual machine. The hypervisor executes on the one or more processors to map the second memory into the third virtual machine at a second BAR of the second virtual host device. The second memory is part of the second guest OS of the second virtual machine. The hypervisor executes on the one or more processors to send a first mapping from the first virtual machine to the third virtual machine. The first mapping is mapped at a first offset. The hypervisor executes on the one or more processors to send a second mapping from the second virtual machine to the third virtual machine. The second mapping is mapped at a second offset. The hypervisor executes on the one or more processors to send a first address of a first ring of the first guest device to the third virtual machine through the first virtual host device. The first address of the first ring is stored in the first memory of the first virtual machine. The hypervisor executes on the one or more physical processors to send a second address of a second ring of the second guest device to the third virtual machine through the second virtual host device. The second address of the second ring is stored in the second memory of the second virtual machine.

An example system includes a first memory, a second memory, one or more physical processors, a host operating system (OS), an input/output memory management unit (IOMMU), an assigned device, a hypervisor, a first virtual machine include a first guest OS and a second virtual machine including a second guest OS. The one or more physical processors are in communication with the first memory and the second memory. The host OS and the hypervisor execute on the one or more physical processors. Additionally, the first and second virtual machines execute on the one or more physical processors. The hypervisor is configured to expose a virtual host device and a pass-through device to the first guest OS of the first virtual machine. The hypervisor is also configured to expose a guest device to the second guest OS of the second virtual machine. The hypervisor is configured to map the first memory into the first virtual machine at a first base address register (BAR) of the pass-through device and map the second memory into the first virtual machine at a second BAR of the virtual host device. The first memory is part of the assigned device, and a first mapping, which is mapped at a first offset and associated with the first memory, is programmed in the IOMMU. The second memory is part of the second guest OS of the second virtual machine. The hypervisor is further configured to send a second mapping, which is mapped at a second offset, from the second virtual machine to the first virtual machine, send a first address of a first ring of the assigned device to the first virtual machine, and send a second address of a second ring of the guest device to the first virtual machine through the virtual host device. The first address of the first ring is stored in the first memory and the second address of the second ring is stored in the second memory of the second virtual machine. The first guest OS of the first virtual machine is configured to read a descriptor available in the second ring supplied by the guest device, translate a third address of the guest device using the second offset within a second BAR of the virtual host device, and send a fourth address of the guest device to the assigned device.

An example method includes reading, by a first driver of a first virtual machine, a first descriptor available in a first ring supplied by an assigned device, and reading, by a second driver of the first virtual machine, a second descriptor available in a second ring supplied by a guest device. The second driver translates an address of the guest device using an offset within a BAR of a virtual host device. The first driver performs a first operation on at least one first packet within the first ring of the assigned device, and the second driver performs a second operation on at least one second packet within the second ring of the guest device.

An example method includes detecting, by a first guest OS of a first virtual machine, a virtual host device, which is exposed by the hypervisor. The first guest OS also detects a pass-through device, which is exposed by the hypervisor. Additionally, a second guest OS of a second virtual machine detects a guest device exposed by the hypervisor. The method further includes receiving, by the first guest OS of the first virtual machine, a mapping from the hypervisor. The hypervisor maps a first memory into the first virtual machine at a first base address register (BAR) of the virtual host device, the first memory is part of the second guest OS memory of the second virtual machine, and the mapping is mapped at an offset. The first guest OS of the first virtual machine receives a first address of a first ring of the assigned device from the hypervisor. The first address of the first ring is stored in a second memory. The first guest OS also receives a second address of a second ring of the guest device from the hypervisor through the virtual host device. The second address of the second ring is stored in the first memory.

Additional features and advantages of the disclosed method and apparatus are described in, and will be apparent from, the following Detailed Description and the Figures.

DETAILED DESCRIPTION OF EXAMPLE EMBODIMENTS

Figure 1:
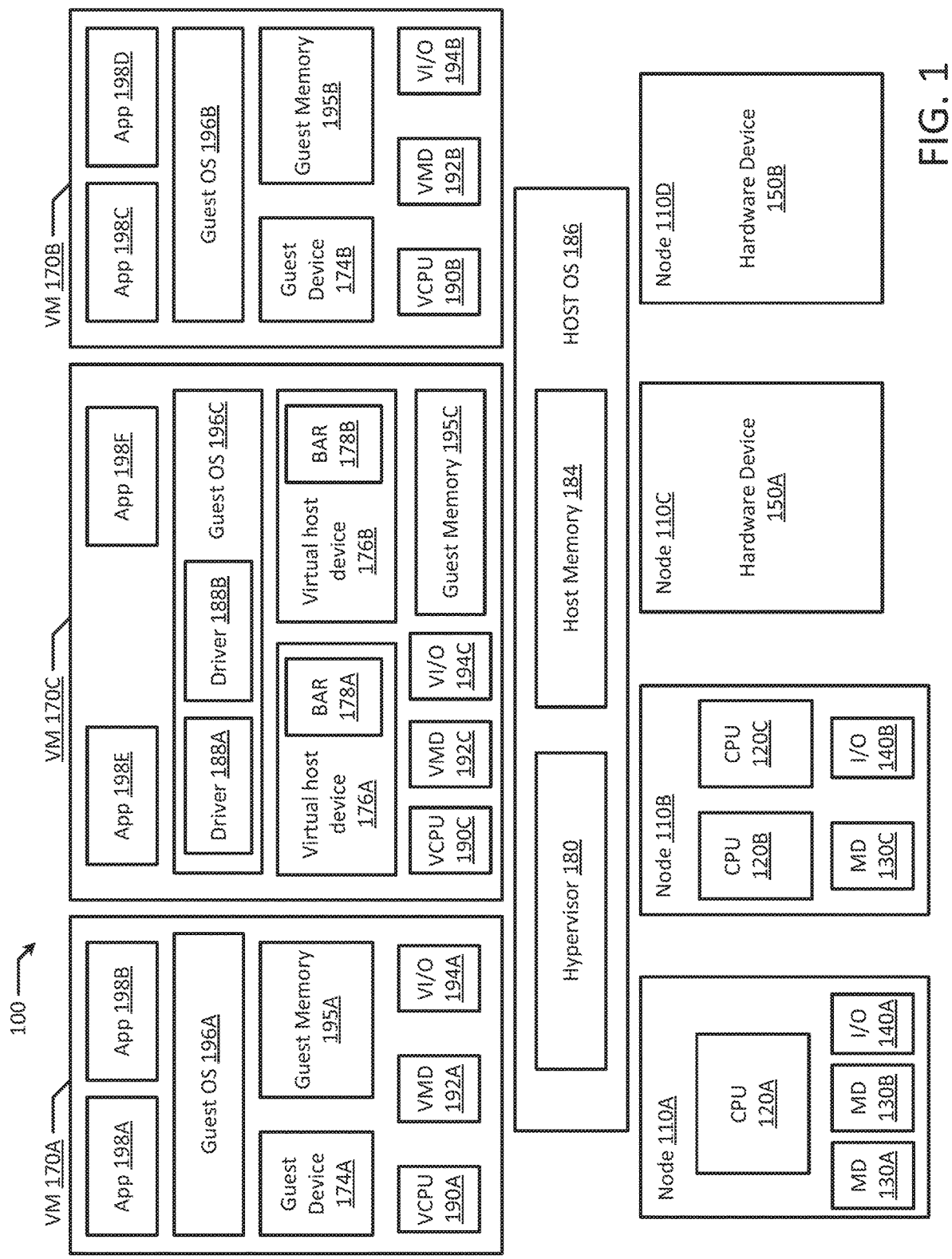
FIG. 1 is a block diagram of an example multiprocessor computer system according to an example embodiment of the present disclosure.

Techniques are disclosed for providing virtual peripheral component interface (PCI) device based hypervisor bypass for virtual machine (VM) bridging. Additionally, techniques are disclosed for providing virtual machine to host device bridging. Generally, to bridge two VMs, code needs to run within a hypervisor on a data path. For example, on a kernel-based virtual machine (KVM), the hypervisor executes packet switching. Running a switch within a VM is possible, but doing so adds overhead as both the hypervisor and the VM preform the switching.

When bridging two virtual machines, the bridge virtual machine moves packet data between a first virtual machine and the bridge virtual machine. A packet address from the first virtual machine and a buffer or ring address from the bridge virtual machine may be translated thereby allowing the memory of the first virtual machine to be read using the translated packet address. Additionally, this allows the memory to be written into the bridge virtual machine using the translated ring address. Then, specific input/output (I/O) operations (e.g., memory operations) may be executed by drivers on the bridge virtual machine to modify the memory of virtual devices in the first virtual and the second virtual machine (e.g., the virtual machines bridged by the bridge virtual machine).

In an example embodiment, a first VM may be bridged to a second VM by a third VM (e.g., bridge virtual machine). In order to do so, during setup, the hypervisor may expose a first virtual guest device (e.g., guest device) to a first guest OS of the first VM and a second virtual guest device (e.g., guest device) to a second guest OS of the second VM. The hypervisor may also expose a virtual host PCI device (e.g., virtual host device) per guest device to the third virtual machine or bridge virtual machine. For example, the hypervisor may expose a first virtual host device associated with the first guest device and a second virtual host device associated with the second guest device to the third virtual machine.

Each virtual host device has memory and a base address register (BAR). The size and address of the memory is exposed to each respective guest OS through the associated BAR. For example, the first virtual host device has memory with a specific size and address that is exposed to a first guest OS (e.g., guest OS of the first VM) through a first BAR of a first virtual host device. Similarly, the second virtual host device has memory with a specific size and address that is exposed to a second guest OS (e.g., guest OS of the second VM) through a second BAR of a second virtual host device.

The hypervisor may map the memory of the first virtual machine into the third virtual machine (e.g., bridge virtual machine) at the BAR by sending a table or list with mappings from the first virtual machine to the third virtual machine (e.g., bridge virtual machine). The mappings may include the physical address of memory of the first virtual machine to a BAR offset. In an example embodiment the mapping may include a single offset, a table, or a list. For example, the list may indicated that addresses S1 to E1 are mapped at offset O1 and that addresses S2 to E2 are mapped at offset O2. Similarly, the hypervisor may map the memory of the second virtual machine into the third virtual machine. Using a virtual host device (e.g., virtual host PCI device) with an associated BAR advantageously allows access to all of the memory of the first and second virtual machines from the third virtual machine (e.g., bridge virtual machine).

Additionally, the hypervisor may send addresses of device rings (e.g., rings associated with the guest devices) in the memory of the first and second virtual machines to the third virtual machine (e.g., bridge virtual machine) through the associated virtual host device. For example, an address of a first ring of the first guest device may be sent to the third virtual machine through the first virtual host device. Similarly, an address of a second ring of the second guest device may be sent to the third virtual machine through the second virtual host device.

Once setup, the third virtual machine (e.g., bridge virtual machine) has a first driver for the first virtual host device and a second driver for the second virtual host device. The first driver and the second driver are part of the third guest OS of the third virtual machine. The first driver maps the first BAR of the first virtual host device. Similarly, the second driver maps the second BAR of the second virtual host device. Once the BAR of each virtual host device is mapped, the third virtual machine (e.g., bridge virtual machine) may transfer data packets between a first virtual machine and a second virtual machine. For example, the third virtual machine may access the mapped BAR to read a descriptor available in a ring supplied by the first guest device, translate physical addresses of the guest device to an offset within the BAR, access an address (e.g., write an incoming data packet, read a data packet, or transmit a data packet). The third virtual machine may also write a descriptor used in a ring of the first guest device or second guest device. In an example embodiment, the first and second drivers may translate addresses of the guest devices. Additionally, the first and second drivers may perform an operation on a data packet within the rings of the guest devices. Thus, the use of a virtual host device (e.g., virtual host PCI device) with an associated BAR advantageously allows direct access from a first virtual machine to a third virtual machine (e.g., bridge virtual machine) without the hypervisor executing on the data path. Additionally, this may be achieved without substantially reducing security. The present disclosure advantageously allows for memory management without host involvement on the data path, is compatible with writing drivers for all operating systems (e.g., for Windows® guests without paravirtualization), and enables a virtual machine using guest programmable BARs to lay out memory in an optimal way. Furthermore, the present disclosure advantageously allows virtual machines to be used for network function virtualization (NFV) workloads with more security and manageability than host switching.

The above described configuration and data packet operations advantageously allow the virtual machines (e.g., first and second VMs and third VM or bridge VM) to do polling without an exit to the hypervisor. For example, the first virtual machine may submit an I/O request from the first guest device to the hypervisor. In an example embodiment, the first virtual machine may submit the I/O request to the third virtual machine (e.g., bridge virtual machine). The I/O request may be submitted from the first guest device or some other component, program, function, procedure, subroutine, code, or the like. Response to the request, the third virtual machine (e.g., bridge virtual machine) may execute the I/O request. As used herein, an input/output (I/O) operation describes any transfer of data to or from one device (e.g., computer, VM, component, program, function, etc.) and to or from another device (e.g., peripheral device, VM, component, program, function, etc.). For example, every transfer is an output from one device and in input into another device. Thus, the I/O request may be advantageously submitted and executed by the virtual machines without further involvement from the hypervisor.

In an example embodiment, the hypervisor may inject a virtual interrupt into the first virtual host device of the third virtual machine (e.g., bridge virtual machine) and by doing so, may signal to the third virtual machine that the I/O request needs to be given immediate attention. For example, the third virtual machine may receive the I/O request and may process the request when as the request moves to the front of the queue. If a virtual interrupt is used, the VCPU of the third virtual machine may be alerted and the current code the VCPU is executing on the third virtual machine will be interrupted so that the I/O request can be immediately executed. In another example embodiment, the hypervisor may inject a virtual interrupt into the guest devices of the first virtual machine and second virtual machine based on other I/O operations associated with them.

In an example embodiment, the I/O operations may relate to memory modification between the virtual machines. Additionally, one of the virtual machines can notify the hypervisor about memory that it modified.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device, the operation of which is based on the processor inputting and/or outputting binary data.

Processors 120A-C may be interconnected using a variety of techniques, ranging from a point-to-point processor interconnect, to a system area network, such as an Ethernet-based network. Local connections within and/or between each node 110A-D, including the connections between a processor 120A and a memory device 130A-B and between a processor 120A and an I/O device 140A may be provided by one or more local buses of suitable architecture, for example, peripheral component interconnect (PCI). As used herein, a device of the host OS 186 (or "host device") may refer to CPU 120A-C, MD 130A-C, I/O 140A-B, a software device, and/or hardware device 150A-B.

As noted above, computer system 100 may run multiple virtual machines (e.g., VM 170A-C), by executing a software layer (e.g., hypervisor 180) above the hardware and below the virtual machines 170A-C, as schematically shown in FIG. 1. In an example embodiment, the hypervisor 180 may be a component of the host operating system 186 executed by the computer system 100. In another example embodiment, the hypervisor 180 may be provided by an application running on the operating system 186, or may run directly on the computer system 100 without an operating system beneath it. The hypervisor 180 may virtualize the physical layer, including processors, memory, and I/O devices, and present this virtualization to virtual machines 170A-C as devices, including virtual processors (e.g., VCPU 190A-C), virtual memory devices (e.g., VMD 192A-C), and/or virtual I/O devices (e.g., VI/O 194A-C).

In an example embodiment, a virtual machine 170A-C may execute a guest operating system 196A-C which may utilize the underlying VCPU 190A-C, VMD 192A-C, and VI/O devices 194A-C. One or more applications 198A-F may be running on a virtual machine 170A-C under the respective guest operating system 196A-C. Processor virtualization may be implemented by the hypervisor 180 scheduling time slots on one or more physical processors 120A-C such that from the guest operating system's perspective those time slots are scheduled on a virtual processor 190A-C.

A virtual machine (e.g., VM 170A-C) may run on any type of dependent, independent, compatible, and/or incompatible applications on the underlying hardware and OS (e.g., Host OS 186). In an example embodiment, applications (e.g., App 198A-F) run on a virtual machine (e.g., VM 170A-C) may be dependent on the underlying hardware and/or OS 186. In another example embodiment, applications (e.g., App 198A-F) run on a virtual machine (e.g., VM 170A-C) may be independent of the underlying hardware and/or OS 186. For example, applications (e.g., App 198A-B) run on a first virtual machine VM 170A may be dependent on the underlying hardware and/or OS 186 while applications (e.g., App 198C-D) run on a second virtual machine VM 170B are independent of the underlying hardware and/or OS 186. Additionally, applications (e.g., App 198A-F) run on a virtual machine (e.g., VM 170A-C) may be compatible with the underlying hardware and/or OS 186. In an example embodiment, applications (e.g., App 198A-F) run on a virtual machine (e.g., VM 170A-C) may be incompatible with the underlying hardware and/or OS. For example, applications (e.g., App 198A-B) run on one virtual machine (e.g., VM 170A) may be compatible with the underlying hardware and/or OS 186 while applications (e.g., App 198C-D) run on another virtual machine (e.g., VM 170B) are incompatible with the underlying hardware and/or OS 186. In an example embodiment, a device may be implemented as a virtual machine (e.g., VM 170A-C).

The hypervisor 180 manages host memory 184 for the host operating system 186 as well as memory allocated to the virtual machines 170A-C and guest operating systems 196A-C such as guest memory 195A-C provided to guest OS 196A-C. Host memory 184 and guest memory 195A-C may be divided into a plurality of memory pages that are managed by the hypervisor 180. Guest memory 195A-C allocated to the guest OS 196A-C are mapped from host memory 184 such that when a guest application 198A-F uses or accesses a memory page of guest memory 195A-C it is actually using or accessing host memory 184.

The hypervisor 180 may expose additional devices to each virtual machine. For example, VMs 170A-B may include guest devices 174A-B that are exposed by the hypervisor. VM 170C may include virtual host devices 176A-B (e.g., virtual host PCI devices) that are exposed by the hypervisor 180. Each virtual host device 176A-B may include a base address register (BAR) 178A-B. Additionally the guest OS 196C of VM 170C (e.g., bridge virtual machine) may include drivers 188A-B that are configured to read, translate, and perform operations on descriptors and packets available in device rings (e.g., rings) supplied by the respective guest devices 174A-B of VMs 170A-B. The BARs 178A-B may store the physical base addresses and may be used to hold memory addresses used by the respective virtual host devices 176A-B and guest devices 174A-B or offsets.

In an example embodiment, one or more page tables may be maintained by the hypervisor 180 for each of the VMs 170A-C, which maps virtual addresses to physical addresses that are accessible by each of the VMs 170A-C. Additionally, the BARs 178A-B may be used to map virtual addresses to physical addresses corresponding to the BAR 178A-B.

Figure 2A:
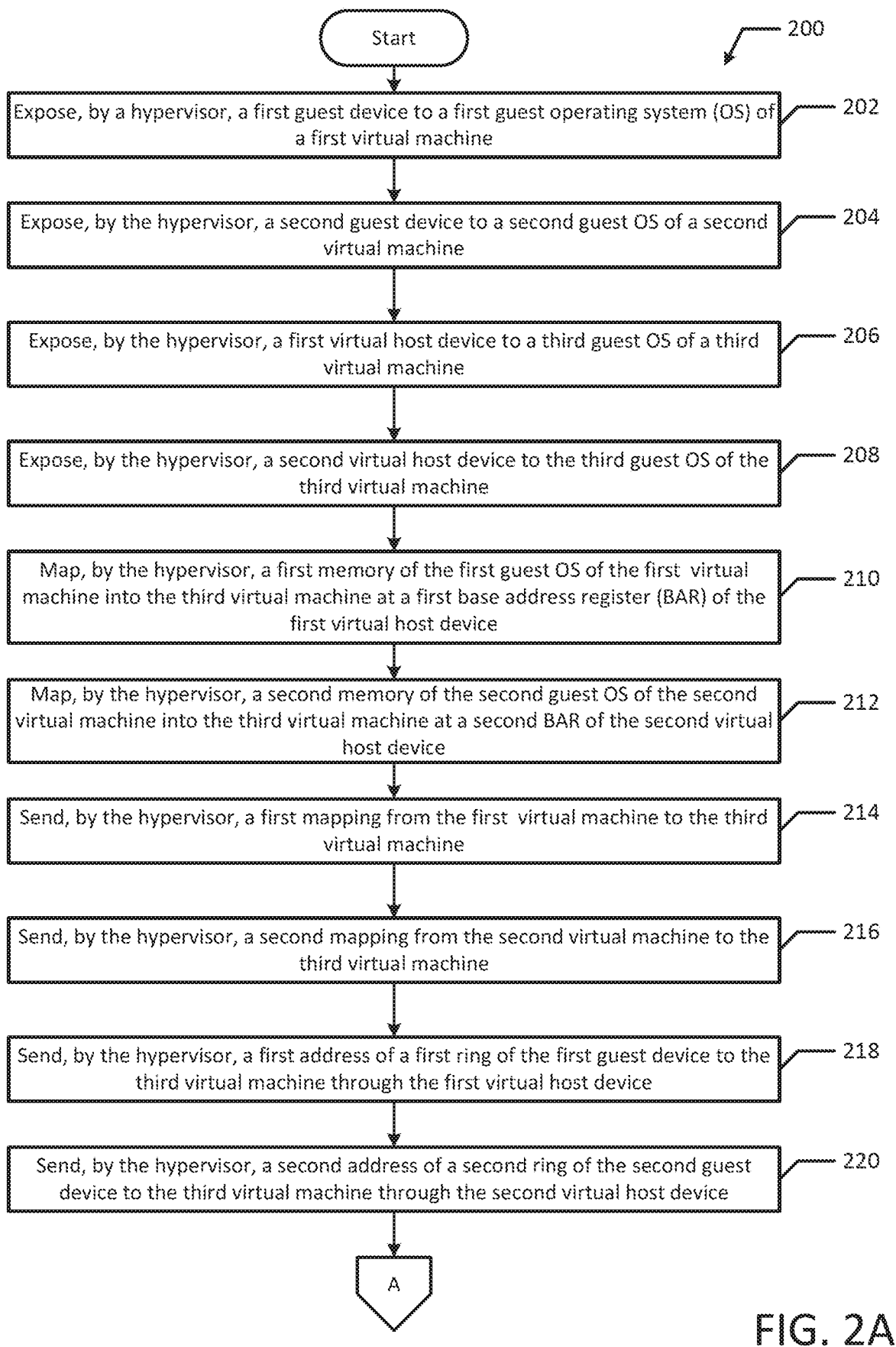
FIGS. 2A and 2B are a flowchart illustrating an example method for virtual machine bridging according to an example embodiment of the present disclosure.
Figure 2B:
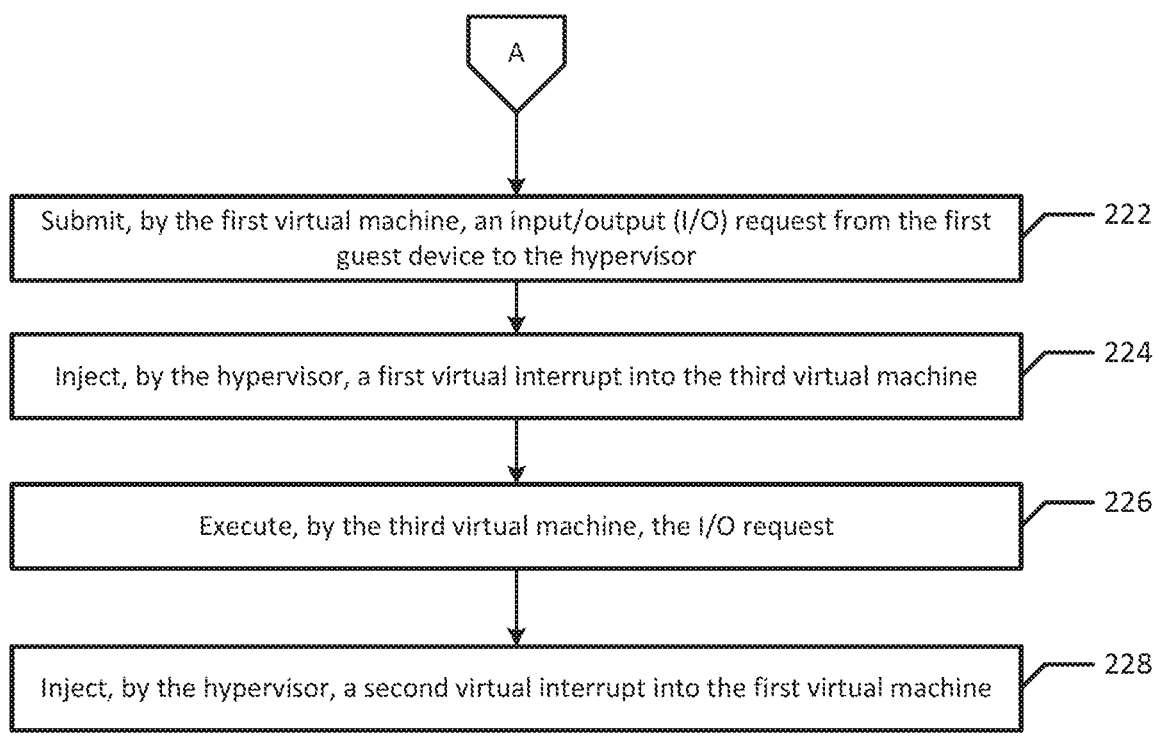

FIGS. 2A and 2B illustrate a flowchart of an example method for virtual machine bridging according to an example embodiment of the present disclosure. Although the example method 200 is described with reference to the flowchart illustrated in FIGS. 2A and 2B, it will be appreciated that many other methods of performing the acts associated with the method 200 may be used. For example, the order of some of the blocks may be changed, certain blocks may be combined with other blocks, and some of the blocks described are optional. In an example embodiment, the method 200 may be performed by processing logic that may comprise hardware (circuitry, dedicated logic, etc.), software, or a combination of both. In an example embodiment, the method is performed by a hypervisor 180.

The example method 200 starts with a hypervisor 180 exposing a first guest device 174A to a first guest OS 196A of a first virtual machine 170A (block 202). The example method 200 continues by the hypervisor 180 exposing a second guest device 174B to a second guest OS 196B of a second virtual machine 170B (block 204). In an example embodiment, the first guest device 174B may be a component, program, function, procedure, subroutine, code, or the like. The hypervisor 180 also exposes a first virtual host device 176A to a third guest OS 196C of a third virtual machine 170C (block 206). For example, the hypervisor 180 may expose a virtual host PCI device to the guest OS 196C of VM 170C. The hypervisor also exposes a second virtual host device 176B to a third guest OS 196C of the third virtual machine 170C (block 208). Then, the hypervisor 180 may map a first memory of the first guest OS 196A into the third virtual machine 170C at a first base address register (BAR) 178A of the first virtual host device 176A (block 210). The hypervisor 180 may also map a second memory of the second guest OS 196B into the third virtual machine 170C at a second BAR 178B of the second virtual host device 178B (block 212). Then, the hypervisor 180 may send a first mapping from the first virtual machine 170A to the third virtual machine 170C (block 214). The hypervisor 180 may send a second mapping from the second virtual machine 170B to the third virtual machine 170C (block 216). In an example embodiment, the mapping may be a table (e.g., page table), a list, an offset or a combination thereof. For example, the hypervisor 180 may send a mapping such as addresses S1 to E1 mapped at offset O1.

Then, the hypervisor 180 may send a first address of a first ring of the second guest device 174A to the third virtual machine 170C through the first virtual host device 176A (block 218). The hypervisor 180 may send a second address of a second ring of the second guest device 174B to the third virtual machine 170C through the second virtual host device 176B (block 220). As used herein, a device ring may be referred to as a ring buffer memory or memory buffer. For example, when data packet contents are received, they may be stored in a ring buffer memory, and the location of the next packet may be updated (e.g., first packet starting address+first packet length). Then, after the memory is mapped, the first virtual machine 170A may submit an input/output (I/O) request from the second guest device 174A to the hypervisor 180 (block 222). Additionally, the hypervisor 180 may inject a first virtual interrupt into the third virtual machine 170C (block 224). For example, if the I/O request is of high importance, the virtual interrupt may be used to ensure that the third virtual machine treats the I/O request with high priority. Then, the third virtual machine 170C may execute the I/O request (block 226). In an example embodiment, the I/O operation may be any transfer of data to or from one VM (e.g., VM 170C) to another VM (e.g., VM 170A and VM 170B) and may relate to memory modification between the virtual machines. For example, every transfer is an output from one device and in input into another device. The hypervisor 180 may inject a second virtual interrupt into the first virtual machine 170A (block 228).

Figure 3:
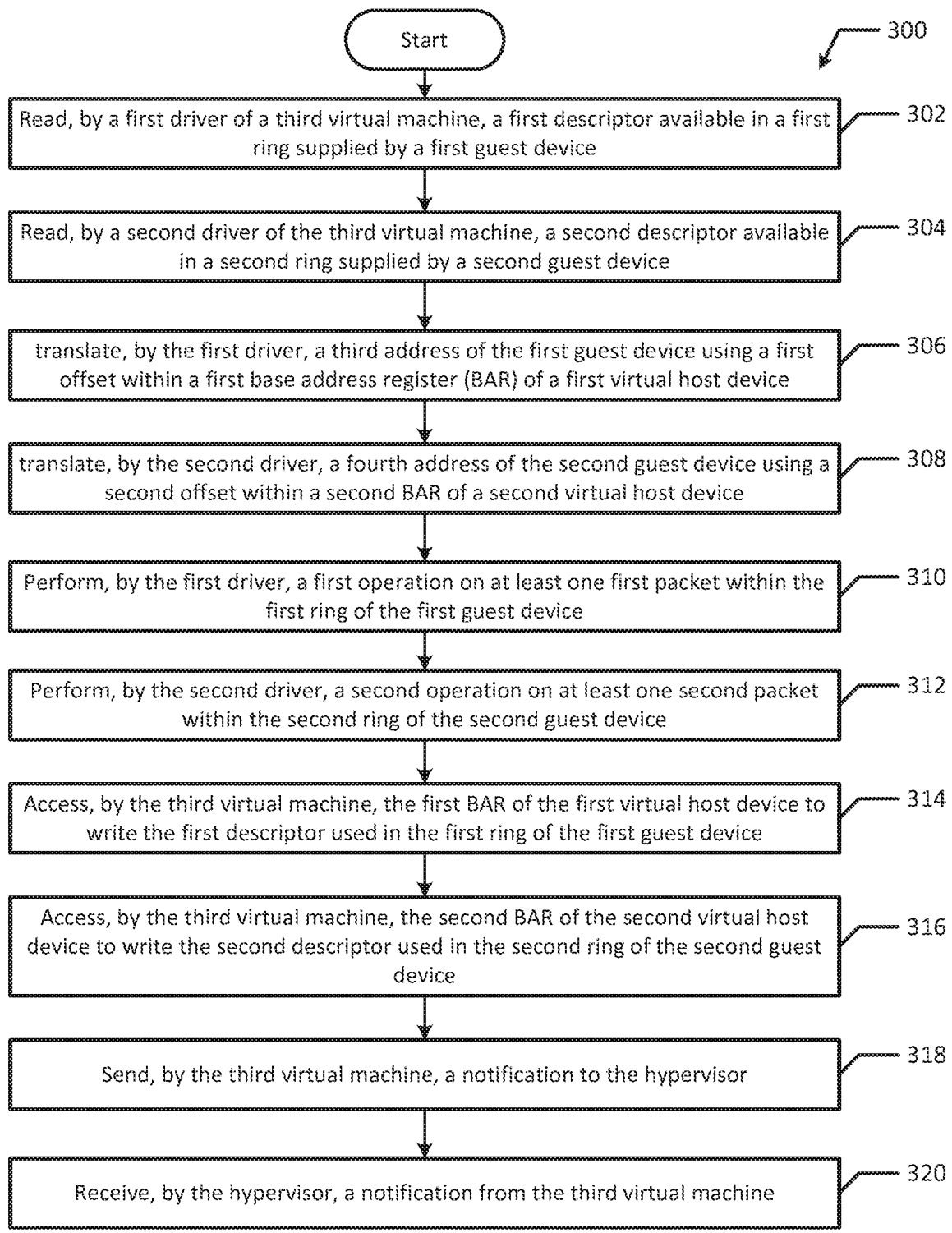
FIG. 3 is a flowchart illustrating an example method for sharing data via virtual machine bridging according to an example embodiment of the present disclosure.

FIG. 3 illustrates a flowchart of an example method for sharing data via virtual machine bridging according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. In an example embodiment, the method 300 may be performed by processing logic that may comprise hardware (circuitry, dedicated logic, etc.), software, or a combination of both. In an example embodiment, the method is performed by VMs (e.g., 170A-C).

The example method 300 starts with a first driver 188A of the third virtual machine 170C reading a first descriptor available in the first ring supplied by the first guest device 174A (block 302). A second driver 188B of the third virtual machine 170C may read a second descriptor available in a second ring supplied by the second guest device 174B (block 304). Then, the first driver 188A may translate a third address of the first guest device 174A using a first offset within the first BAR 178A of the first virtual host device 176A (block 306). The second driver 188B may translate a fourth address of the second guest device 174B using a second offset within a second BAR 178B of the second virtual host device 176B (block 308). The first driver may also perform a first operation on a first packet within the first ring of the second guest device 174A (block 310). Additionally, the second driver 188B may perform a second operation on a second packet within the second ring of the second guest device 174B (block 312). In an example embodiment, the drivers 188A-B may access an address, write an incoming packet, read a packet, or transmit a packet. The third virtual machine 170C may access the first BAR 178A of the first virtual host device 176A to write the first descriptor used in the first ring of the second guest device 174A (block 314). The third virtual machine 170C may also access the second BAR 178B of the second virtual host device 176B to write the second descriptor used in the second ring of the second guest device 174B (block 316). The third virtual machine 170C may send a notification to the hypervisor 180 (block 318). For example, the third virtual machine 170C may notify the hypervisor 180 of any memory modification that has taken place. Next, the hypervisor 180 receives the notification from the third virtual machine 170C (block 320).

Figure 4:
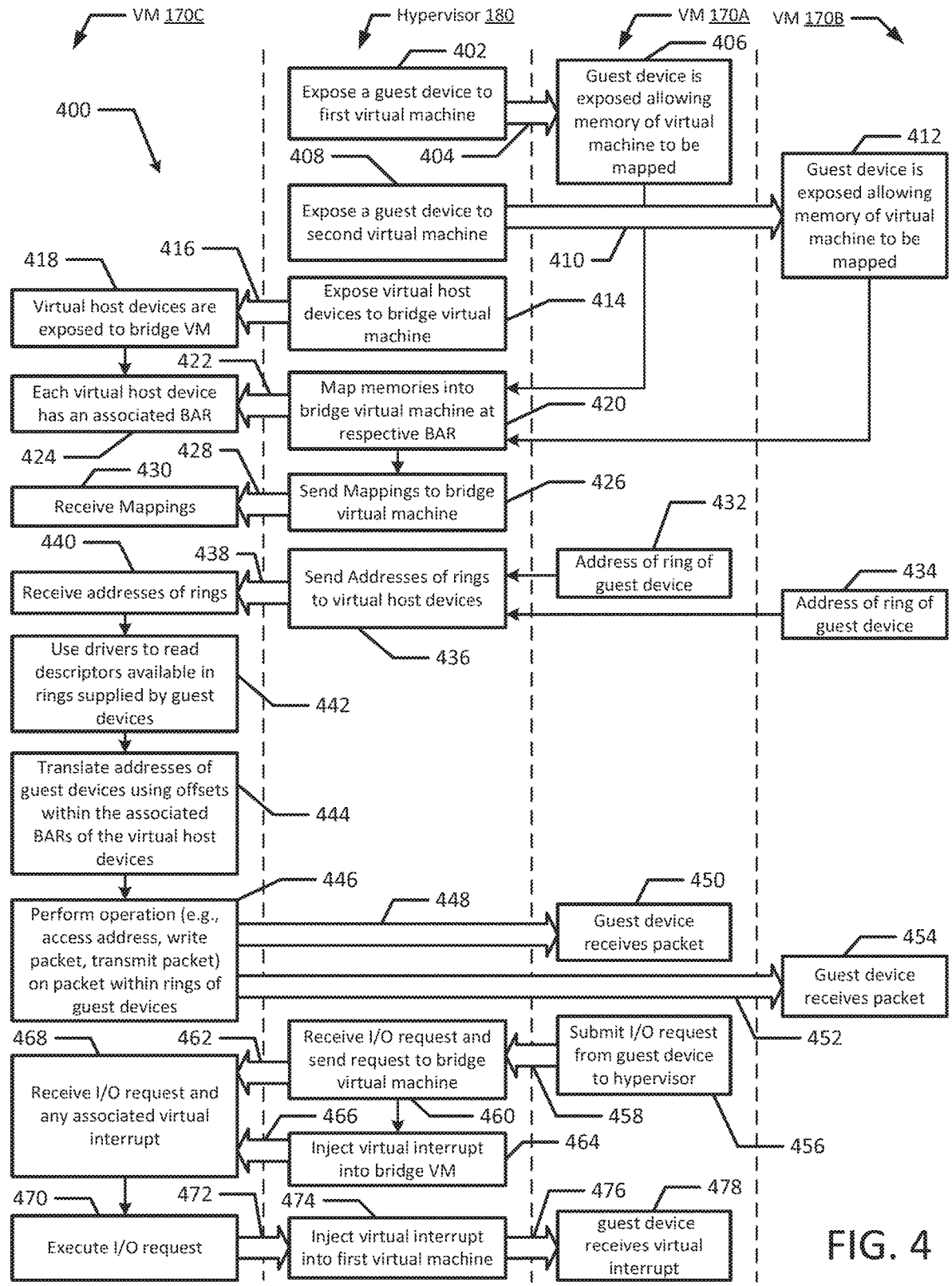
FIG. 4 is a flow diagram illustrating an example method for virtual machine bridging according to an example embodiment of the present disclosure.

FIG. 4 illustrates a flow diagram of an example method for virtual PCI device based hypervisor bypass for VM bridging. Although the example method is described with reference to the flow diagram illustrated in FIG. 4, it will be appreciated that many other methods of performing the acts associated with the method may be used. For example, the order of some of the blocks may be changed, certain blocks may be combined with other blocks, and some of the blocks described are optional. The method may be performed by processing logic that may comprise hardware (circuitry, dedicated logic, etc.), software, or a combination of both.

In the illustrated example embodiment, a hypervisor 180 is in communication with virtual machines 170A-C. In an example embodiment, virtual machine 170C acts as a virtual machine bridge between virtual machine 170A and virtual machine 170B. In alternate example embodiments, the hypervisor 180 is in communication with virtual machines (e.g., VM 170A-C), applications (e.g., App 198A-F), virtual processors (e.g., VCPU 190A-C), virtual memory devices (e.g., VMD 192A-C), and/or virtual I/O devices (e.g., VI/O 194A-C).

The hypervisor 180 facilitates configuring the virtual machines for bridging by exposing a guest device 174A to the first virtual machine 170A (blocks 402 and 404). The guest device 174A is exposed in the first virtual machine 170A, which allows the memory of the virtual machine 170A to be mapped (block 406). Similarly, the hypervisor 180 may expose a guest device 174B to the second virtual machine 170B (blocks 408 and 410). The guest device 174B is exposed in the second virtual machine 170B, which allows the memory of the virtual machine 170B to be mapped (block 412). The hypervisor 180 may also expose virtual host devices 176A-B to the third virtual machine 170C (e.g., bridge virtual machine) (blocks 414 and 416). The virtual host devices 176A-B are exposed to the third virtual machine 170C (block 418). Then, the hypervisor 180 may map memories into the third virtual machine 170C (e.g., bridge virtual machine) at each respective BAR 178A-B, such that each virtual host device 174A-B has an associated BAR 178A-B (block 420 to 424). Then, the hypervisor 180 may send mappings to the third virtual machine 170C (blocks 426 and 428). The third virtual machine 170C receives the mappings from the hypervisor 180 (block 430). In an example embodiment, the mappings may include in a table. Additionally, the mappings may include a list or an offset.

When the first guest device 174A is exposed to the first virtual machine 170A, and the second guest device 174B is exposed to the second virtual machine 170B, each guest device is associated with a respective device ring, which has an address (blocks 432 and 434). In an example embodiment, each ring may be used to store the contents of packets in the ring. The hypervisor 180 sends addresses of the rings to the virtual host devices (blocks 436 and 438). For example, the address of the first ring associated with the second guest device 174A may be sent to the first virtual host device 176A. Additionally, the address of the second ring associated with the second guest device 174B may be sent to the second virtual host device 176B. Then, the third virtual machine 170C receives the addresses of the rings (block 440). The third virtual machine 170C may use the first driver 188A and the second driver 188B to read descriptors available in the rings supplied by the guest devices 174A-B (block 442). For example, the first driver 188A may be configured to read descriptors available in the first ring supplied by the first guest device 174A. Additionally, the second driver may be configured to read descriptors available in the second ring supplied by the second guest device 174B.

Additionally, the third virtual machine 170C may translate the addresses of the guest devices to offsets within the associated BARs of the virtual host devices (block 444). For example, the third virtual machine 170C may translate the first address of the second guest device 174A using a first offset within the first BAR 178A of the first virtual host device 176A. Similarly, the third virtual machine 170C may translate the second address of the second guest device 174B using a second offset within the second BAR 178B of the second virtual host device 176B. Then, the third virtual machine 170C may perform an operation on one or more packets within the rings of the guest devices (block 446 and 448). For example, the third virtual machine 170C may access an address, write a packet, or transmit a packet to the respective guest devices 174A-B of the first or second virtual machines 170A-B. In an example embodiment, the third virtual machine 170C may transmit a packet to the first virtual machine 170A, and in response to transmitting the packet, the guest device of the first virtual machine 170A receives the packet (block 450). Similarly, the third virtual machine 170C may transmit a packet to the second virtual machine 170B, thereafter the guest device 174B of the second virtual machine 170B receives the packet (blocks 452 and 454).

The guest device 174A of the first virtual machine 170A may also submit an I/O request to the hypervisor 180 (block 456 and 458). Then, the hypervisor 180 receives the request and sends the request to the third virtual machine 170C (e.g., bridge virtual machine) (blocks 460 and 462). In an example embodiment, the hypervisor 180 may inject a virtual interrupt into the third virtual machine 170C (block 646 and 466). In an example embodiment, the virtual interrupt may be injected into the third virtual machine 170C at the same time that the hypervisor 180 sends the I/O request, or the virtual interrupt may be injected into the third virtual machine 170C after the hypervisor 180 sends the I/O request. Additionally, in an example embodiment, the hypervisor 180 may inject a virtual interrupt into specific devices exposed to each VM. For example, the hypervisor 180 may inject a virtual interrupt into the first guest device 174A of the first virtual machine 170A. Similarly, the hypervisor may inject a virtual interrupt into the second guest device 174B of the second virtual machine 170B. The hypervisor 180 may also inject a virtual interrupt into one or more of the virtual host devices 176A-B of the third virtual machine 170C. By using a virtual interrupt, the I/O request may be processed without waiting in a queue. In another example embodiment, the hypervisor 180 may not inject a virtual interrupt at all and allow the I/O request to be processed by the third virtual machine 170C in the normal order. The third virtual machine 170C receives the I/O request and any associated injected virtual interrupt (block 468). Then, the third virtual machine 170C may execute the I/O request (block 470 and 472). If the I/O request is related to an operation on the first virtual machine 170A, the hypervisor may inject a virtual interrupt into the first virtual machine 170A (block 474 and 476). Then, the guest device receives the virtual interrupt (block 478). Accordingly, the example method 400 advantageously provides for memory management without host involvement on the data path, and may provide NFV workload with enhanced security and manageability.

Figure 5:
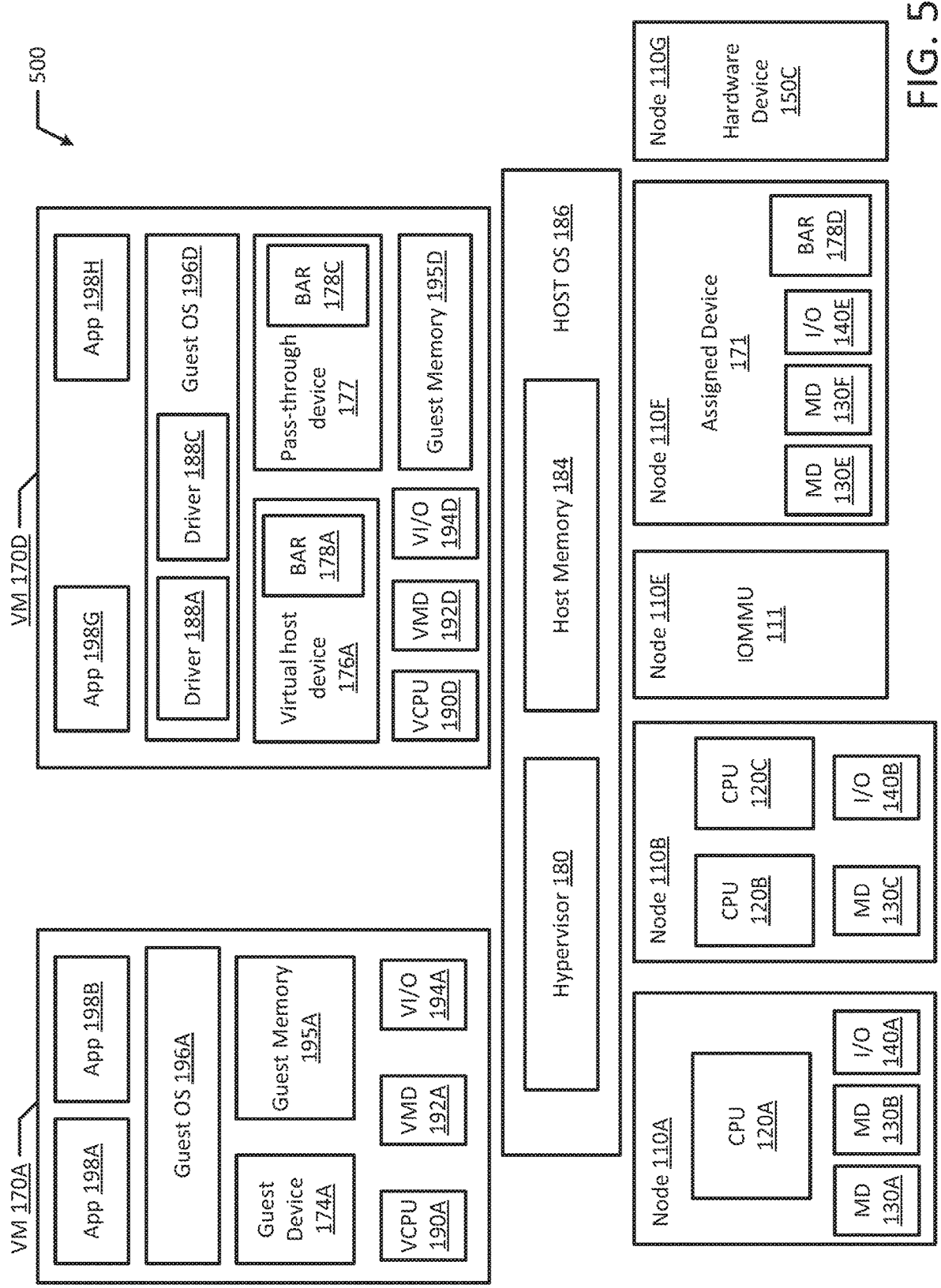
FIG. 5 is a block diagram of an example multiprocessor computer system according to an example embodiment of the present disclosure.

FIG. 5 depicts a high-level component diagram of an example multi-processor computer system 100 in accordance with one or more aspects of the present disclosure. The computer system 500 may include one or more interconnected nodes 110A-G (nodes 110C-D not illustrated here but illustrated in FIG. 1). As explained above, each node 110A-B may in turn include one or more physical processors (e.g., CPU 120A-C) communicatively coupled to memory devices (e.g., MD 130A-C) and input/output devices (e.g., I/O 140A-B). Node 110E may include an IOMMU 111 and node 110F may include an assigned device 171. Additionally, node 110G may include a hardware device 150C. In an example embodiment, a hardware device (e.g., 150C) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

In an example embodiment, an assigned device 171 may be a networking device or a storage device. Assigned device 171 may include memory (e.g., MD 130D-E) and an I/O device (e.g., I/O 140C). Additionally, the assigned device 171 may include a base address register (e.g., BAR 178D). BAR 178D may be associated with BAR 178C as discussed in more detail below.

As discussed herein, a memory device 130E-F refers to a volatile or non-volatile memory device, such as RAM, ROM, EEPROM, or any other device capable of storing data. As discussed herein, I/O device 140C refers to a device capable of providing an interface between one or more processor pins and an external device, the operation of which is based on the processor inputting and/or outputting binary data.

Local connections within and/or between each node 110A-G, including the connections between a processor 120A and a memory device 130A-B and between a processor 120A and an I/O device 140A may be provided by one or more local buses of suitable architecture, for example, peripheral component interconnect (PCI). As used herein, a device of the host OS 186 (or "host device") may refer to CPU 120A-C, MD 130A-E, I/O 140A-C, a software device, IOMMU 111, assigned device 171, and/or hardware device 150A-C.

As noted above, computer system 500 may run multiple virtual machines (e.g., VM 170A and VM 170D), by executing a software layer (e.g., hypervisor 180) above the hardware and below the virtual machines 170A and 170D, as schematically shown in FIG. 5. In an example embodiment, the hypervisor 180 may be a component of the host operating system 186 executed by the computer system 500. In another example embodiment, the hypervisor 180 may be provided by an application running on the operating system 186, or may run directly on the computer system 500 without an operating system beneath it. The hypervisor 180 may virtualize the physical layer, including processors, memory, and I/O devices, and present this virtualization to virtual machines 170A and 170D as devices, including virtual processors (e.g., VCPU 190A and 190D), virtual memory devices (e.g., VMD 192A and 192D), and/or virtual I/O devices (e.g., VI/O 194A and 194D).

In an example embodiment, a virtual machine 170D may execute a guest operating system 196D which may utilize the underlying VCPU 190D, VMD 192D, and VI/O devices 194D. One or more applications 198G-H may be running on a virtual machine 170D under the respective guest operating system 196D. Processor virtualization may be implemented by the hypervisor 180 scheduling time slots on one or more physical processors 120A-C such that from the guest operating system's perspective those time slots are scheduled on a virtual processor 190D.

The hypervisor 180 manages host memory 184 for the host operating system 186 as well as memory allocated to the virtual machine 170D and guest operating system 196D such as guest memory 195D provided to guest OS 196D. Host memory 184 and guest memory 195D may be divided into a plurality of memory pages that are managed by the hypervisor 180. Guest memory 195D allocated to the guest OS 196D may be mapped from host memory 184 such that when a guest application 198G-H uses or accesses a memory page of guest memory 195D it is actually using or accessing host memory 184.

The hypervisor 180 may expose additional devices to each virtual machine. For example, VM 170A may include guest device 174A that is exposed by the hypervisor 180. VM 170D may include virtual host devices 176A (e.g., virtual host PCI devices) and pass-through device 177 that are exposed by the hypervisor 180. As discussed above in reference to FIG. 1, virtual host device 176A may include a base address register (BAR) 178A. Additionally, the pass-through device 177 may include BAR 178C. Also, the guest OS 196D of VM 170D (e.g., bridge virtual machine) may include drivers 188A and 188C that are configured to read, translate, and perform operations on descriptors and packets available in device rings (e.g., rings) supplied by the respective guest device 174A and/or assigned device 171. In an example embodiment, VM 170D may include driver 188B and virtual host device 176B with associated BAR 178B as illustrated in FIG. 1. The BARs (e.g., BAR178A-D) may store the physical base addresses and may be used to hold memory addresses and/or offsets used by the respective virtual host devices 176A-B, pass-through device 177, guest devices 174A-B, and/or assigned device 171.

Figure 6A:
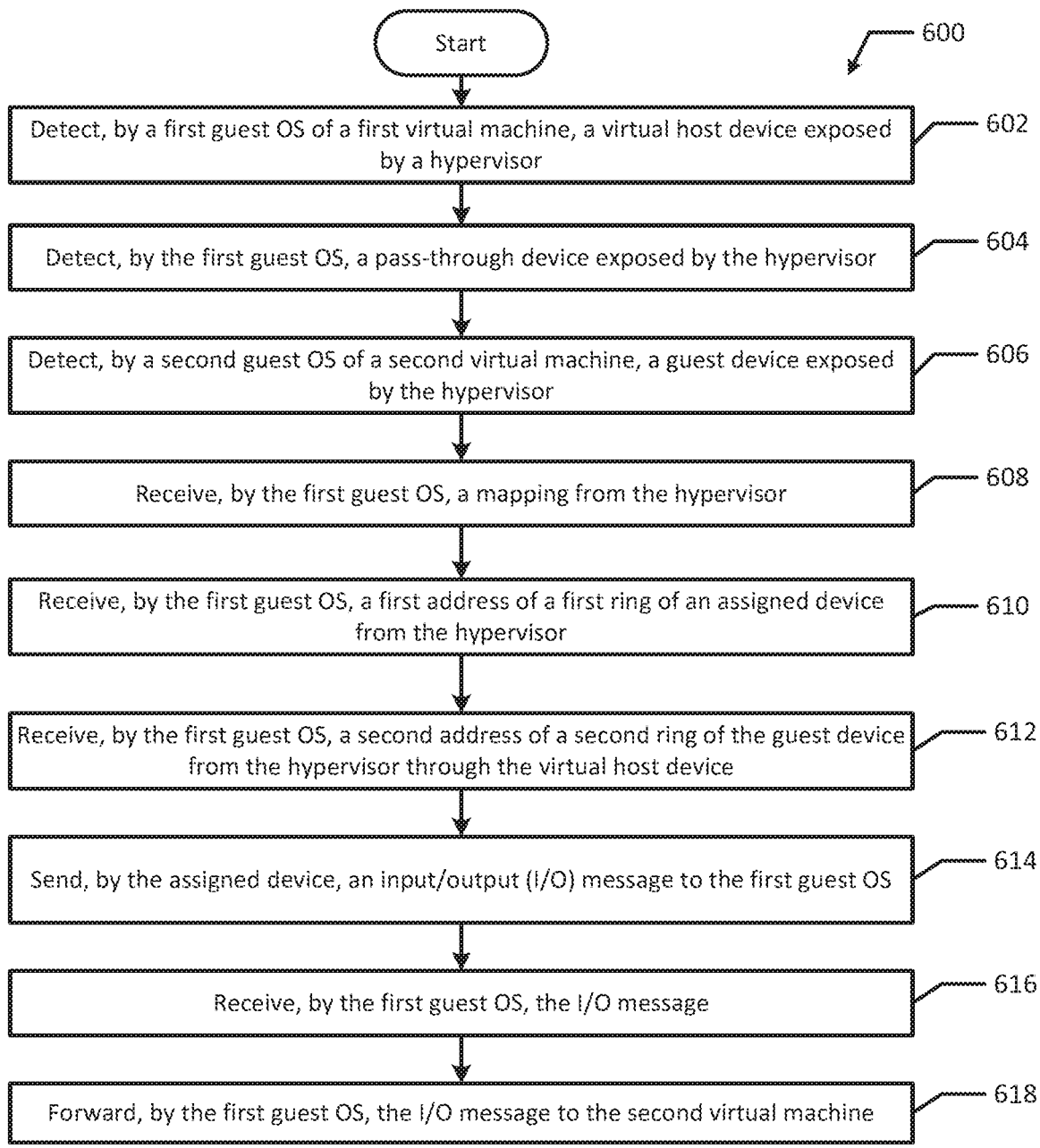
FIG. 6A is a flowchart illustrating an example method for virtual machine to host device bridging according to an example embodiment of the present disclosure

FIG. 6A illustrates a flowchart of an example method virtual machine to host device bridging according to an example embodiment of the present disclosure. Although the example method 600 is described with reference to the flowchart illustrated in FIG. 6A, it will be appreciated that many other methods of performing the acts associated with the method 600 may be used. For example, the order of some of the blocks may be changed, certain blocks may be combined with other blocks, and some of the blocks described are optional. In an example embodiment, the method 600 may be performed by processing logic that may comprise hardware (circuitry, dedicated logic, etc.), software, or a combination of both.

The example method 600 starts with a detecting, by a first guest OS 196D of a first virtual machine 170D, a virtual host device 176A exposed by a hypervisor 180 (block 602). For example, the hypervisor 180 may expose a virtual host PCI device to the guest OS 196D of VM 170D. The first guest OS 196D may detect a pass-through device 177 exposed by the hypervisor 180 (block 604). A second guest OS 196A of a second virtual machine 170A may detect a guest device 174A exposed by the hypervisor 180 (block 606). In an example embodiment, the guest device 174A may be a component, program, function, procedure, subroutine, code, or the like. The first guest OS 196D may receive a mapping from the hypervisor 180 (block 608). In an example embodiment, the mapping may be a table (e.g., page table), a list, an offset or a combination thereof. For example, the hypervisor 180 may send a mapping such as addresses S1 to E1 mapped at offset O1. The first guest OS 196D may receive a first address of a first ring of an assigned device 171 from the hypervisor 180 (block 610). The first guest OS 196D may receive a second address of a second ring of the guest device 174A from the hypervisor 180 through the virtual host device 176A (block 612). As used herein, a device ring may be referred to as a ring buffer memory or memory buffer. For example, when data packet contents are received, they may be stored in a ring buffer memory, and the location of the next packet may be updated (e.g., first packet starting address+first packet length). The assigned device 171 may send an input/output (I/O) message to the first guest OS 196D (block 614). In an example embodiment, the I/O message may be a request for another device or component to execute an I/O operation. Responsive to the assigned device 171 sending the I/O message, the first guest OS 196D may receive the I/O message (block 616). The first guest OS 196D may forward the I/O message to the second virtual machine 170A (block 618). In an example embodiment, the second virtual machine 170A may send a second I/O message based on the I/O message received from the assigned device 171.

Figure 6B:
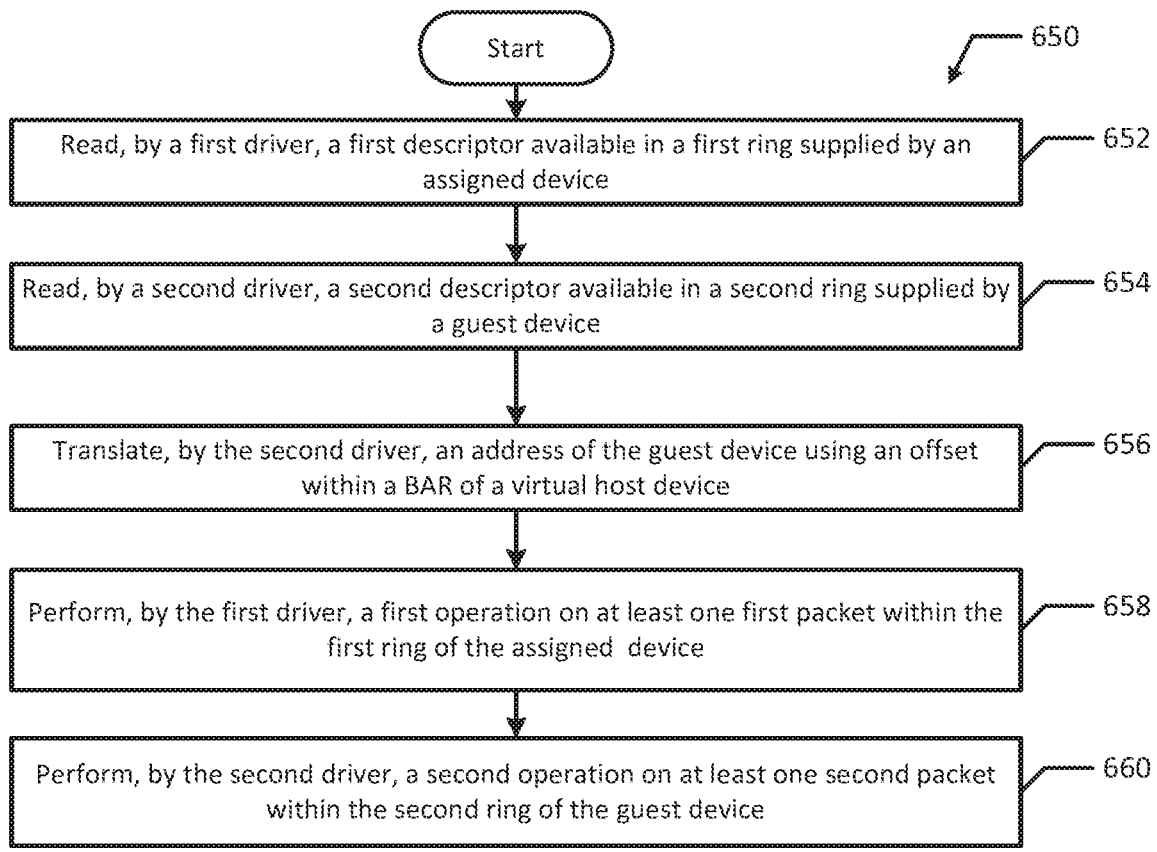
FIG. 6B is a flowchart illustrating an example method for sharing data via virtual machine to host device bridging according to an example embodiment of the present disclosure.

FIG. 6B illustrates a flowchart of an example method for sharing data via virtual machine to host device bridging according to an example embodiment of the present disclosure. Although the example method 650 is described with reference to the flowchart illustrated in FIG. 6B, it will be appreciated that many other methods of performing the acts associated with the method 650 may be used. For example, the order of some of the blocks may be changed, certain blocks may be combined with other blocks, and some of the blocks described are optional. In an example embodiment, the method 650 may be performed by processing logic that may comprise hardware (circuitry, dedicated logic, etc.), software, or a combination of both.

The example method 650 starts with a reading, by a first driver 188C, a first descriptor available in a first ring supplied by an assigned device 171 (block 652). For example, the first driver 188C may be configured to read descriptors available in the first ring supplied by the assigned device 171. In an example embodiment, the assigned device 171 may be a networking device or a storage device. A second driver 188A may read a second descriptor available in a second ring supplied by a guest device 174A (block 654). Additionally, the second driver 188A may be configured to read descriptors available in the second ring supplied by guest device 174A. The second driver 188A may translate an address of the guest device 174A using an offset within a BAR 178A of a virtual host device 176A (block 656). The first driver 188C may perform a first operation on at least one first packet within the first ring of the assigned device 171 (block 658). In an example embodiment, the first driver 188C may access an address, write an incoming packet, read a packet, or transmit a packet. The second driver 188A may perform a second operation on at least one second packet within the second ring of the guest device 174A (block 660). In an example embodiment, the second driver 188A may access an address, write an incoming packet, read a packet, or transmit a packet. In an example embodiment, the second virtual machine 170D may access the BAR 178A of the virtual host device 176A to write the second descriptor used in the second ring of the guest device 174A. Additionally, the second virtual machine 170D may also access the BAR 178C of the pass-through device 177 to write the first descriptor used in the first ring of the assigned device 171.

Figure 7A:
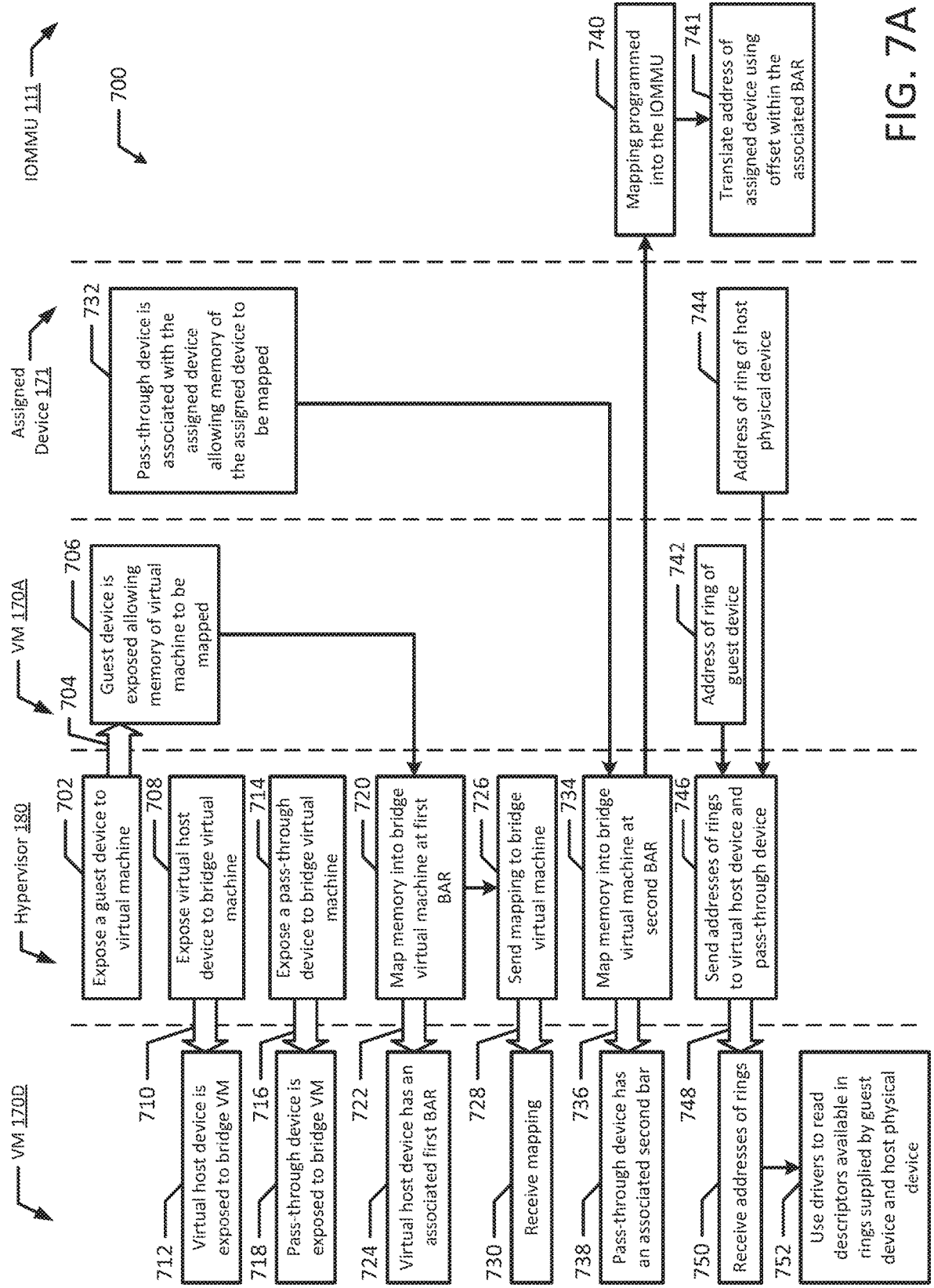
FIGS. 7A and 7B are a flow diagram illustrating an example method for virtual machine to host device bridging according to an example embodiment of the present disclosure.
Figure 7B:
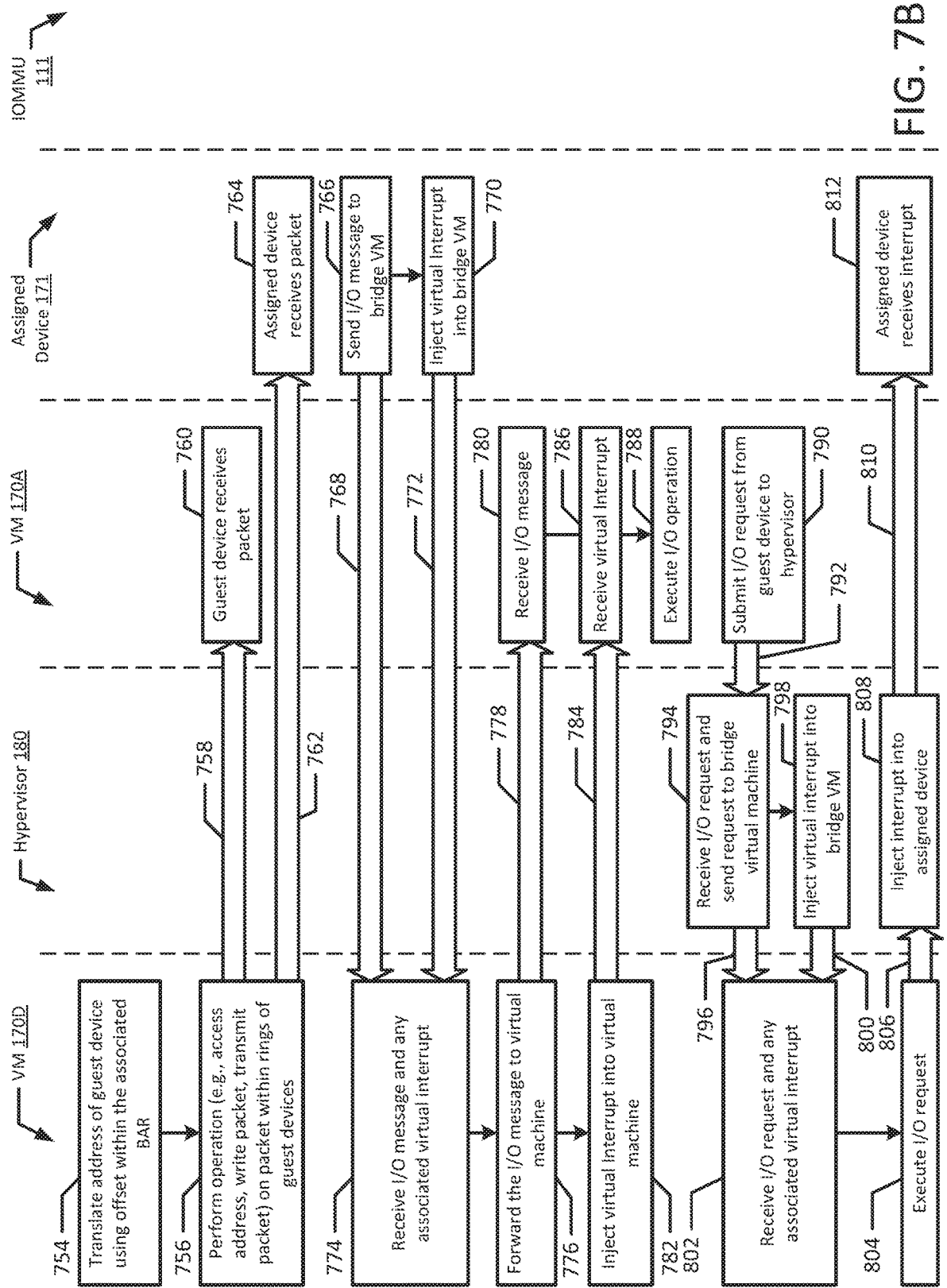

FIGS. 7A and 7B illustrate a flow diagram of an example method for virtual machine to host device bridging. Although the example method 700 is described with reference to the flow diagram illustrated in FIGS. 7A and 7B, it will be appreciated that many other methods of performing the acts associated with the method 700 may be used. For example, the order of some of the blocks may be changed, certain blocks may be combined with other blocks, and some of the blocks described are optional. The method 700 may be performed by processing logic that may comprise hardware (circuitry, dedicated logic, etc.), software, or a combination of both.

In the illustrated example embodiment, a hypervisor 180 is in communication with virtual machines 170A and 170D. In an example embodiment, virtual machine 170D acts as a bridge between virtual machine 170A and assigned device 171. In alternate example embodiments, the hypervisor 180 is in communication with virtual machines (e.g., VM 170A-D), applications (e.g., App 198A-H), virtual processors (e.g., VCPU 190A-D), virtual memory devices (e.g., VMD 192A-D), and/or virtual I/O devices (e.g., VI/O 194A-D).

The hypervisor 180 facilitates configuring the virtual machines and assigned device 171 for bridging by exposing a guest device 174A to a first virtual machine 170A (blocks 702 and 704). In an example embodiment, additional guest devices (e.g., guest device 174B) may be exposed to a second virtual machine (e.g., VM 170B) in order to bridge multiple virtual machines (e.g., VM 170A-B) to a host device (e.g., assigned device 171). For example, a system 100, 500 may include multiple bridge virtual machines allow for communication between many virtual machines and assigned devices. The guest device 174A is exposed in the first virtual machine 170A, which allows the memory of the first virtual machine 170A to be mapped (block 706). The hypervisor 180 may also expose a virtual host device 176A to a second virtual machine 170D (e.g., bridge virtual machine) (blocks 708 and 710). The virtual host device 176A is exposed to the second virtual machine 170D (block 712). In an example embodiment, a second virtual host device (e.g., virtual host device 176B) may be exposed to the second virtual machine 170D. The hypervisor 180 may expose a pass-through device 177 to the second virtual machine 170D (e.g., bridge virtual machine) (blocks 714 and 716). The pass-through device 177 is exposed to the second virtual machine 170D (block 718). In an example embodiment, a second pass-through device may be exposed to the second virtual machine 170D to bridge multiple host devices.

Then, the hypervisor 180 may map a first memory into the second virtual machine 170D (e.g., bridge virtual machine) at a first BAR 178A, such that the virtual host device 174A has an associated BAR 178A (block 720 to 724). Then, the hypervisor 180 may send a first mapping to the second virtual machine 170D (blocks 726 and 728). The second virtual machine 170D receives the mappings from the hypervisor 180 (block 730). In an example embodiment, the mappings may be included in a table. Additionally, the mappings may include a list or an offset. The pass-through device 177 is associated with the assigned device 171, which allows memory of the assigned device 171 to be mapped (block 732). The hypervisor 180 may map a second memory into the second virtual machine 170D (e.g., bridge virtual machine) at a second BAR 178C, such that the pass-through device has an associated BAR 178C (block 734 to 738). The second mapping may be programmed into the IOMMU 111 (block 740). Additionally, an address of the assigned device 171 may be translated by the IOMMU 111 using an offset within the associated BAR (e.g., BAR 178C-D) (block 741). For example, addresses of the assigned device 171 may be translated to the appropriate addresses within memory of the second virtual machine 170D. In an example embodiment, the assigned device 171 may use the address translated by the IOMMU 111 to send and receive data.

The guest device 174A, which is exposed to the first virtual machine 170A, and the assigned device 171 are associated with respective device rings that each have an address (blocks 742 and 744). In an example embodiment, each ring may be used to store the contents of packets in the ring. The hypervisor 180 sends addresses of the rings to the second virtual machine 170D (blocks 746 and 748). For example, the address of the first ring associated with the guest device 174A may be sent to the virtual host device 176A. Additionally, the address of the second ring associated with the assigned device 171 may be sent to the pass-through device 177. Then, the second virtual machine 170D receives the addresses of the rings (block 750). The second virtual machine 170D may use a first driver 188A and a second driver 188C to read descriptors available in the rings supplied by the guest device 174A and the assigned device 171 (block 752). For example, the first driver 188A may be configured to read descriptors available in the first ring supplied by the first guest device 174A. Additionally, the second driver 188C may be configured to read descriptors available in the second ring supplied by the assigned device 171.

Additionally, the second virtual machine 170D may translate an address of the guest device 174A using an offset within the first BAR 178A of the virtual host device 176A (block 754). For example, the second virtual machine 170D may translate the first address of the guest device 174A using a first offset within the first BAR 178A of first virtual host device 176A. In an example embodiment, the second virtual machine 170D may also translate a second address of a second guest device (e.g., guest device 174B) to a second offset within a second BAR (e.g., BAR 178B) of a second virtual host device 176B for a system that bridges multiple virtual machines to a host device (e.g., the assigned device 171). Then, the second virtual machine 170D may perform an operation on one or more packets within the rings of the guest device 174A and the assigned device 171 (blocks 756, 758, and 762). For example, the second virtual machine 170D may access an address, write a packet, or transmit a packet to the guest device 174A of the first virtual machines 170A. In an example embodiment, the second virtual machine 170D may transmit a packet to the guest device 174A of the first virtual machine 170A. Then, the guest device 174A may receive the packet (block 760). In an example embodiment, the second virtual machine 170D may transmit a packet to the assigned device 171. In response to transmitting the packet, the assigned device 171 may receive the packet (block 764).

The assigned device 171 may send an I/O message to the second virtual machine 170D (e.g., bridge virtual machine) (blocks 766 and 768). In an example embodiment, the I/O message may be a request for another device or component to execute an I/O operation. The assigned device 171 may also inject a virtual interrupt into the second virtual machine 170D (blocks 770 and 772). In an example embodiment, the virtual interrupt may be injected into the second virtual machine 170D at the same time that the assigned device 171 sends the I/O message, or the virtual interrupt may be injected into the second virtual machine 170D after the assigned device 171 sends the I/O message. By using a virtual interrupt, the I/O message may be processed without waiting in a queue. In another example embodiment, the assigned device 171 may not inject a virtual interrupt at all and allow the I/O message to be processed by the second virtual machine 170D in the normal order. The second virtual machine 170D may receive the I/O message and any associated virtual interrupt (block 774). In an example embodiment, the I/O message may be directed to the first virtual machine 170A. The second virtual machine 170D (e.g., bridge virtual machine) may forward the I/O message to the first virtual machine 170A (blocks 776 and 778). In an example embodiment, the second virtual machine 170D may send a second different I/O message based on the I/O message received from the assigned device 171. The first virtual machine 170A may receive the I/O message sent from the assigned device 171 and forwarded by the second virtual machine 170D (block 780). In an example embodiment, the first virtual machine 170A may receive a second I/O message based on the I/O message sent to the second virtual machine 170D. The second virtual machine 170D (e.g., bridge virtual machine) may also inject a virtual interrupt into the first virtual machine 170A (blocks 782 and 784). In an example embodiment, the second virtual machine 170D may inject the virtual interrupt before, during, or after forwarding the I/O message to the first virtual machine 170A. Then, the first virtual machine 170A may receive the virtual interrupt (block 786). Based on the I/O message received, the first virtual machine 170A may execute an I/O operation (block 788). For example, the first virtual machine 170A may access an address, write a packet, or transmit a packet based on instructions in the I/O message.

The guest device 174A of the first virtual machine 170A may also submit an I/O request to the hypervisor 180 (block 790 and 792). Then, the hypervisor 180 may receive the request and may send the request to the second virtual machine 170D (e.g., bridge virtual machine) (blocks 794 and 796). In an example embodiment, the hypervisor 180 may inject a virtual interrupt into the second virtual machine 170D (blocks 798 and 800). In an example embodiment, the virtual interrupt may be injected into the second virtual machine 170D at the same time that the hypervisor 180 sends the I/O request, or the virtual interrupt may be injected into the third virtual machine 170C after the hypervisor 180 sends the I/O request. Additionally, in an example embodiment, the hypervisor 180 may inject a virtual interrupt into specific devices exposed to each virtual machine. For example, the hypervisor 180 may inject a virtual interrupt into a guest device 174A of the first virtual machine 170A. The hypervisor 180 may also inject a virtual interrupt into the virtual host devices 176A or the pass-through device 177 of the second virtual machine 170D. By using a virtual interrupt, the I/O request may be processed without waiting in a queue. In another example embodiment, the hypervisor 180 may not inject a virtual interrupt at all and allow the I/O request to be processed by the third virtual machine 170C in the normal order. The second virtual machine 170D receives the I/O request and any associated injected virtual interrupt (block 802). Then, the second virtual machine 170D may execute the I/O request (blocks 804 and 806). If the I/O request is related to an operation on the assigned device 171, the hypervisor 180 may inject an interrupt into the assigned device 171 (blocks 808 and 810). Then, the assigned device 171 may receive the interrupt (block 812). Accordingly, the example method 700 advantageously provides for memory management between virtual machines and host devices, and may provide NFV workload with enhanced security and manageability.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The invention is claimed as follows:

1. A system, comprising:
an assigned device including data storage;
a guest device in a first virtual machine (VM); and a host system including a processor in communication with a memory, wherein the processor is configured to execute a second VM, the second VM including a virtual host device for use by the guest device, a first driver and a second driver, where the guest device communicates directly with the virtual host device on a data path, through the second VM, without a hypervisor executing on the data path, the second VM is in communication with the assigned device via the first driver and in communication with the guest device via the second driver, wherein the first driver and the second driver are configured to:

read, by the first driver, a first descriptor available in a first ring supplied by the assigned device, read, by the second driver, a second descriptor available in a second ring supplied by the guest device, translate, by the second driver after reading the second descriptor, an address in the first VM of the guest device using an offset within a register of the virtual host device, perform, by the first driver after reading the first descriptor, a first operation on at least one first packet within the first ring of the assigned device, and perform, by the second driver, a second operation on at least one second packet within the second ring of the guest device in the first VM based on the translated address without the hypervisor executing on the data path, wherein the second VM is configured to access the register of the virtual host device to write the second descriptor used in the second ring of the quest device and access a register of a pass-through device in the second VM to write the first descriptor used in a first ring supplied by the assigned device.

2. The system of claim 1, wherein a guest OS of the second VM includes the first driver and the second driver.

3. The system of claim 2, further comprising, sending, by the guest OS of the second VM, the address to the assigned device.

4. The system of claim 1, wherein the first operation includes at least one of (i) accessing an address, (ii) writing an incoming packet, (iii) reading the at least one first packet, and (iv) transmitting the at least one first packet.

5. The system of claim 1, wherein the second operation includes at least one of (i) accessing an address, (ii) writing an incoming packet, (iii) reading the at least one first packet, and (iv) transmitting the at least one first packet.

6. The system of claim 1, wherein the register is a base address register.

7. A method, comprising:

reading, by a first driver, a first descriptor available in a first ring supplied by an assigned device including data storage, wherein a first virtual machine (VM) includes a quest device, a second VM includes the first driver and a virtual host device for use by the guest device, and the second VM is in communication with the assigned device via the first driver and in communication with the guest device via a second driver in the second VM;

reading, by the second driver, a second descriptor available in a second ring supplied by the guest device, wherein the assigned device, via the first ring, is in communication with the guest device, via the second ring, where the guest device communicates directly with the virtual host device on a data path, through the second VM, without a hypervisor executing on the data path;

translating, by the second driver after reading the second descriptor, an address in the first VM of the guest device using an offset within a register of the virtual host device;

performing, by the first driver after reading the first descriptor, a first operation on at least one first packet within the first ring of the assigned device; and performing, by the second driver, a second operation on at least one second packet within the second ring of the guest device in the first VM based on the translated address without the hypervisor executing on the data path, wherein the second VM is configured to access the register of the virtual host device to write the second descriptor used in the second ring of the quest device and access a register of a pass-through device in the second VM to write the first descriptor used in a first ring supplied by the assigned device.

8. The method of claim 7, wherein a guest OS of the second VM includes the first driver and the second driver.

9. The method of claim 8, further comprising, sending, by the guest OS of the second VM, the address to the assigned device.

10. The method of claim 7, wherein the first operation includes at least one of (i) accessing an address, (ii) writing an incoming packet, (iii) reading the at least one first packet, and (iv) transmitting the at least one first packet.

11. The method of claim 7, wherein the second operation includes at least one of (i) accessing an address, (ii) writing an incoming packet, (iii) reading the at least one first packet, and (iv) transmitting the at least one first packet.

12. The method of claim 7, wherein the register is a base address register.

13. A non-transitory machine readable medium storing a program, which when executed by a processor, causes the processor to:

read, by a first driver, a first descriptor available in a first ring supplied by an assigned device including data storage, wherein a first virtual machine (VM) includes a guest device, a second VM includes the first driver and a virtual host device for use by the guest device, and the second VM is in communication with the assigned device via the first driver and in communication with the quest device via a second driver in the second VM;

read, by the second driver, a second descriptor available in a second ring supplied by the guest device, wherein the assigned device, via the first ring, is in communication with the guest device, via the second ring, where the guest device communicates directly with the virtual host device on a data path, through the second VM, without a hypervisor executing on the data path;

translate, by the second driver after reading the second descriptor, an address in the first VM of the guest device using an offset within a register of the virtual host device;

perform, by the first driver after reading the first descriptor, a first operation on at least one first packet within the first ring of the assigned device; and perform, by the second driver, a second operation on at least one second packet within the second ring of the guest device in the first VM based on the translated address without the hypervisor executing on the data path, wherein the second VM is configured to access the register of the virtual host device to write the second descriptor used in the second ring of the quest device and access a register of a pass-through device in the second VM to write the first descriptor used in a first ring supplied by the assigned device.

14. The non-transitory machine readable medium of claim 13, wherein the register is a base address register.

15. The non-transitory machine readable medium of claim 13, wherein the first operation includes at least one of (i) accessing an address, (ii) writing an incoming packet, (iii) reading the at least one first packet, and (iv) transmitting the at least one first packet; and the second operation includes at least one of (i) accessing an address, (ii) writing an incoming packet, (iii) reading the at least one first packet, and (iv) transmitting the at least one first packet.

\* \* \* \* \*

UNITED STATES PATENT AND TRADEMARK OFFICE
CERTIFICATE OF CORRECTION

PATENT NO. : 11,113,089 B2
APPLICATION NO. : 15/905101
DATED : September 7, 2021
INVENTOR(S) : Michael Tsirkin et al.

Page 1 of 1

It is certified that error appears in the above-identified patent and that said Letters Patent is hereby corrected as shown below:

In the Claims

In Column 19, Lines 31 to 32 (Claim 1), replace "the quest device" with -- the guest device --.

In Column 19, Line 54 (Claim 7), replace "a quest device" with -- a guest device --.

In Column 20, Line 14 (Claim 7), replace "the quest device" with -- the guest device --.

In Column 20, Line 44 (Claim 13), replace "the quest device" with -- the guest device --.

In Column 20, Line 66 (Claim 13), replace "the quest device" with -- the guest device --.

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*